J. M. KELLY.
Corn-Planter.
No. 39,931.  Patented Sept. 15. 1863.
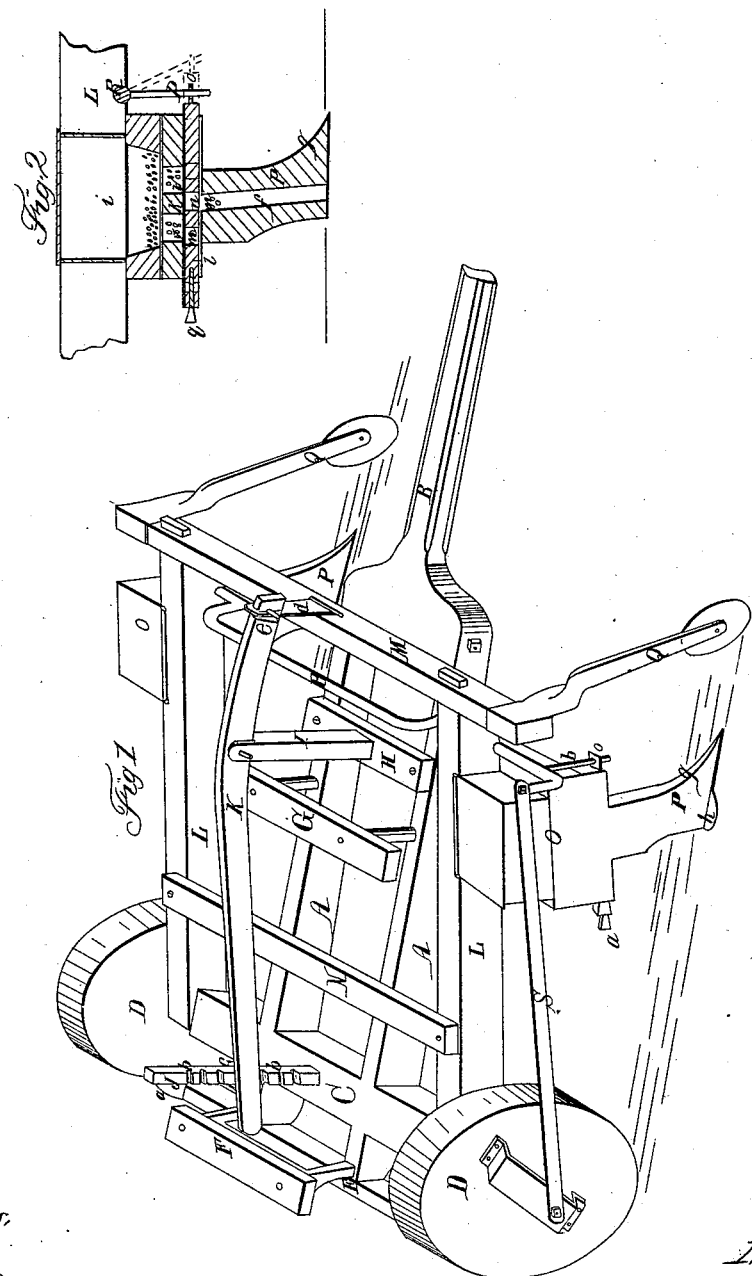
Witnesses,
A M Dye
S A Chapin
Inventor.
J M Kelly

UNITED STATES PATENT OFFICE.

JOHN M. KELLY, OF CLINTON, ILLINOIS.

IMPROVEMENT IN SEED-PLANTERS.

Specification forming part of Letters Patent No. 39,931, dated September 15, 1863; antedated November 2, 1861.

*To all whom it may concern:*

Be it known that I, J. M. KELLY, of Clinton, in the county of Dewitt and State of Illinois, have invented a new and useful Improvement in Seed-Planters; and I hereby declare that the following is a full, clear, and exact description of the same, reference being had to the accompanying drawings, and letters of reference marked thereon, which form part of this specification.

My invention relates especially to the means of regulating the depth of furrow in which the seed is to be deposited.

In order that others properly skilled may be enabled to understand and construct my invention, I shall proceed to describe it in detail.

In the accompanying drawings, Figure 1 is a perspective view of my improved planter. Fig. 2 is a vertical longitudinal section through the seed-boxes and delivering-tubes, plow, &c.

Like letters of reference designate like parts in all the drawings.

A A are the main beams of the body of planter. At the fore end these are joined together, clasping the butt-end of draft-pole B.

C is the main cross-beam, which serves also as the axle-tree of broad-fellied traction-wheels D D.

Behind the beam C is another lighter beam, E, forming the tail of the implement, and upon which beam the scrapers *a a* are affixed, for freeing the traction-wheels of adhering soil.

To the rear of the implement on the longitudinal beams A A is affixed the seat F for the driver. Another seat, G, is constructed and fixed about the middle of the implement on the same beams.

On the main beams A A a cross-rail, H, is secured, and from the rail rises an upright, I. Another upright, J, is affixed to and rises from cross-beam C. The upright is formed with a series of notches, *b b*.

A lever, K, somewhat bent in form, is pivoted on upright I, and by means of spring-catch (not shown in drawings) and staple *c* at its rear end is held at any required elevation by the notches *b b* on upright J. The use of this lever will appear further on in the specification.

L L are two pendulum-beams, pivoted by proper strap-joints on axle of wheels D D. These beams are mortised into cross front beam, M, and further secured together nearer their pivoted ends by the cross-rail N. An iron strap, *d*, or a chain equivalent thereto, is attached by one end to the cross-beam M, and also at the other end to the short end *e* of lever K. By this strap the lever K can raise the pendulum-frame L L, M, and N (to which the plows, cutters, and seeding apparatus are attached) to any required elevation to suit the depth of the furrow desired, or can elevate the plow entirely above the ground when not required to be in operation.

O O are the seed-hoppers, attached to the beams L L.

P P are the cultivators or furrowing-plows or shares, and the delivery-tube *f* from seed-boxes is inside of the beam of plow P. The furrowing-plows are formed in shape pointed in front and inclined in their angles *g*, and furnished with horizontal wings *h*.

On the beam M at each end the revolving cutters Q Q are fixed in a line with center of each plow for the purpose of cutting a passage through any obstructions in the path, or where the implement is used for sod-planting.

The special construction of the seeding apparatus is as follows: Each seeding apparatus consists essentially of a box, *i*, for containing the seed, and in the bottom of this box two openings, *j j*, are made with a bar or coverer, *k*, between. A reciprocating valve, *l*, is arranged beneath these openings, and beneath the valve *l* and vertically underneath the coverer *k* is the entrance of delivery-tube *m*. In the valve *l* two cups or receptacles, *n n*, are formed for the seed, and on one end of the valve an ear, *o*, is formed for receiving the lever or arm *p* of crank R. By means of the temper-screw *q*, in other end of valve *l*, the size of opening to the cups *n n* may be regulated to suit the quantity of seed it is wished to deposit in each hill.

A crank-rod or rocking-shaft, R, is journaled in boxes on under side of beams L, and this shaft is rocked by means of the pitman S, attached at one end to one of the driving-wheels D and at the other end to a crank, *r*, on shaft R. An arm, *p*, projecting at right angles from shaft R, passes through a hole in ear *o* on end of valve in each seeding apparatus, and thus as the implement progresses the valves are reciprocated and the cups of seed *n n* are alternately filled from the hopper *i* and dropped through the delivery-tube *m*. The traction-wheels D, coming behind the deposited seed, cover them up and press them down.

Having described my invention, I proceed to state what I claim and what I desire by Letters Patent to secure:

The arrangement of the pivoted frame L L, M, and N, carrying the shares or plows P, seed-boxes O, and cutter-wheels Q Q, in combination with the stiff main or draft beams A A, lever K, and standard J, for the purpose of regulating the depth of furrow, substantially as and for the purpose set forth.

J. M. KELLY.

Witnesses:
S. A. CHAPIN,
A. M. DYE.